June 10, 1941.   J. P. MINGLE   2,245,075
PHASE CHANGING DEVICE
Filed Sept. 13, 1940   2 Sheets-Sheet 1

INVENTOR
Joseph P. Mingle
By Green & McCallister
His Attorneys

June 10, 1941.  J. P. MINGLE  2,245,075
PHASE CHANGING DEVICE
Filed Sept. 13, 1940  2 Sheets-Sheet 2

INVENTOR
Joseph P. Mingle
By Green & McCallister
His Attorneys

Patented June 10, 1941

2,245,075

UNITED STATES PATENT OFFICE 2,245,075

PHASE CHANGING DEVICE

Joseph P. Mingle, Muncie, Ind., assignor to Ball Brothers Company, a corporation of Indiana Application September 13, 1940, Serial No. 356,621

11 Claims. (Cl. 74—395)

This invention relates to what are known as timing or phase changing devices, devices used for bringing into timed relationship two different machines or devices such as a feeder timer and a glass forming machine, a glass forming machine and a take-out device, etc.

Many timing or phase change devices employ in their make-up some form of differential gearing and an object of this invention is to produce an improved timing or phase change device employing gears which revolve only during phase change adjustments and which are inactive when the device is in normal operation.

Another object is to produce an improved timing or phase change device employing differential gearing but in which the drive and driven shafts revolve in the same direction during normal operation of the device.

A still further object is to produce an improved phase change device employing differential gearing in which the drive and driven shafts revolve in the same direction when in normal operation and in which the phase adjustments may be remotely controlled during operation of the device as a connecting unit.

These and other objects which will be apparent to those skilled in this particular art, I attain by means of the device described in the specification and illustrated in the drawings accompanying and forming part of this application.

The device of this invention comprises a unitary mechanism for so connecting two aligned shafts—drive and driven—that, while such shafts rotate in the same direction and normally at the same speed, their phase relation (angular relation) may be readily changed during operation of the device as a connecting unit between two pieces of apparatus, whereby one such apparatus may be advanced or retarded with relation to the other, during operation. In other words, have the phase of one changed with relation to that of the other.

This change in phase is accomplished by means of a relatively simple differential gearing mechanism in which the gears do not rotate when the device is in operation; the only relative movement between gears occurring during phase change adjustments. The construction of the device is such that phase change adjustments may be remotely controlled, thus permitting the operator of a glass forming machine, a feeder timer, a take-out device or other mechanism—timer, a take-out device or other mechanism— the phase of which with relation to some other mechanism is to be changed—to make such adjustments while observing the machine to be timed.

The drive shaft of the device chosen as an embodiment of this invention is numbered 6 and the driven shaft, which is axially aligned therewith is numbered 7.

Figures 1, 4, 5:
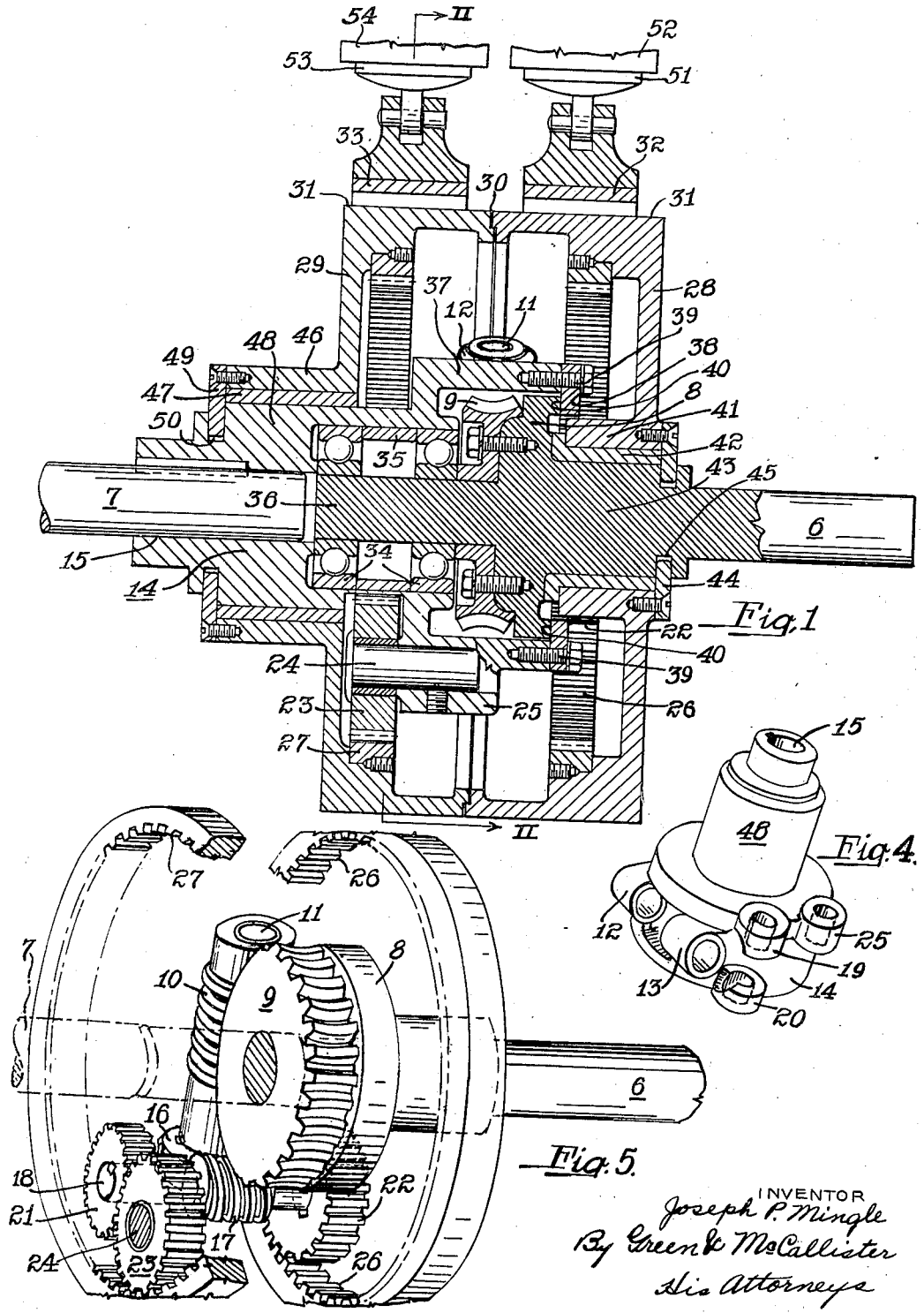
Figure 1 is a vertical section of a device embodying this invention and is taken on line I—I of Fig. 2.
Fig. 4 is a somewhat diagrammatic view in perspective of a portion of the device.
Fig. 5 is a diagrammatic view in perspective of the gearing employed in the device.
Figure 2:
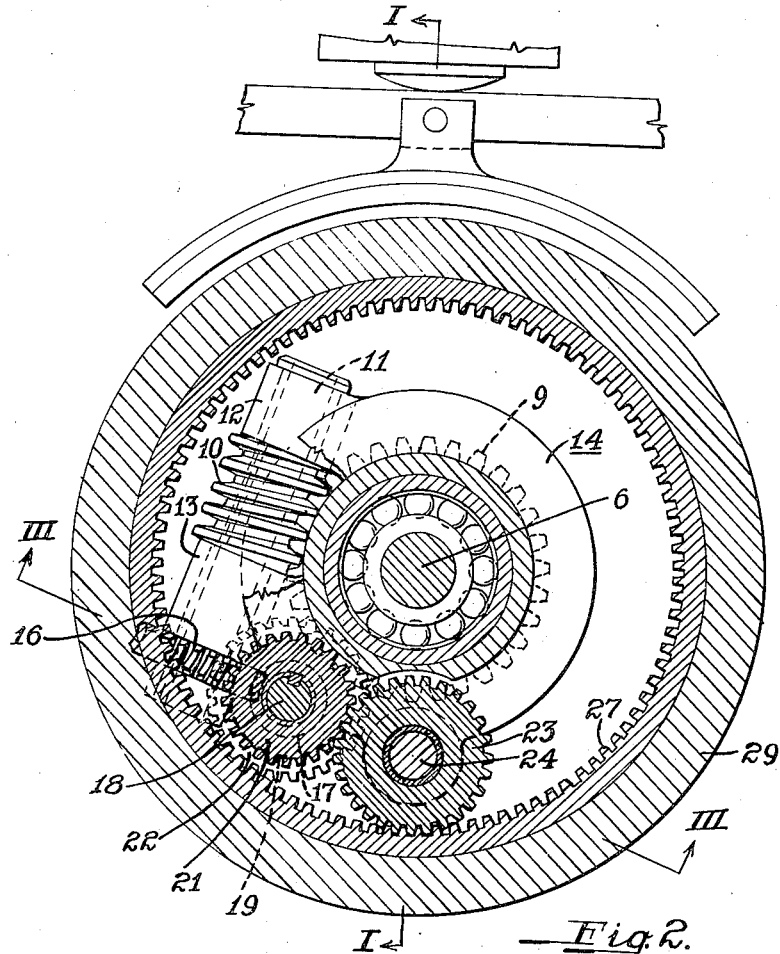
Fig. 2 is a transverse section of the device of Fig. 1 and is taken on line II—II of Fig. 1.
Figure 3:
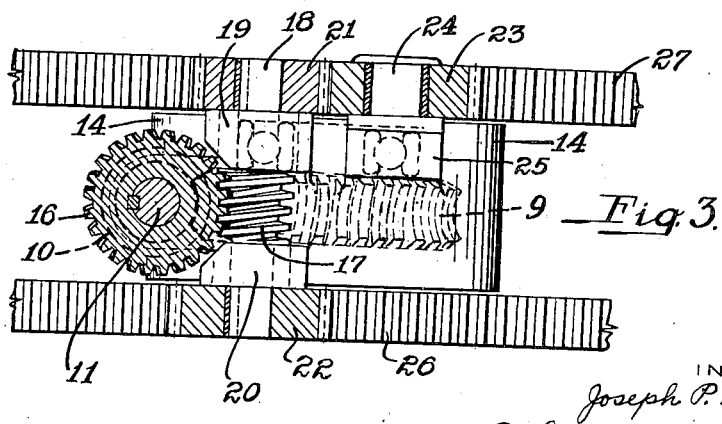
Fig. 3 is a fragmentary view in section and is taken on line III—III of Fig. 2.

Shaft 6 is provided with a circular disk-like enlargement 8 and to this, a worm wheel 9 is rigidly attached as shown in Fig. 1. Worm wheel 9 meshes with a worm 10, keyed to a shaft 11 which is mounted for rotation within bearing support members 12 and 13 formed as parts of a support housing 14 (Fig. 4). Driven shaft 7 is keyed in place within a bore 15 which extends through one end of support housing 14.

A worm wheel 16 keyed to shaft 11 meshes with a worm 17 which is keyed to a shaft 18. Shaft 18 is journaled within spaced bearing support members 19 and 20 which are also formed as parts of support housing 14. Shaft 18 adjacent its ends has keyed to it spur gears 21 and 22 so that both of these gears rotate whenever worm 17 rotates. Gear 21 meshes with an idler gear 23 which is journaled on a stub shaft 24, secured within a support member 25, also formed as part of support housing 14.

Gear 22 meshes with internal ring gear 26 while idler gear 23 meshes with a similar internal ring gear 27.

Ring gear 26 is secured within a brake drum 28 while ring gear 27 is secured within brake drum 29. These brake drums which are of the same diameter, have their meeting edges stepped, as shown at 30 and together form the housing of the phase change device. Each brake drum is provided with a cylindrical braking surface 31 with which brake shoes, numbered 32 in the case of brake drum 28 and 33 in the case of brake drum 29, are arranged to function.

Support housing 14, aside from bore 15 within which the driven shaft is keyed is provided with a bore which is adapted to receive, with a snug fit, the outer races 34—34 of two ball bearings as shown in Fig. 1. These bearings are spaced apart by an annular spacer 35 and their inner races snugly fit the inner end portion 36 of the drive shaft 6. The drive and driven shafts, 6 and 7, are thus held in axial alignment and each is free to rotate independently of the other.

An annular portion 37 of support housing 14 surrounds worm wheel 9 as well as disk-like enlargement 8 of the drive shaft, and an annular retaining ring 38 which is secured to the support housing by means of screws 39, bears against face 40 of disk-like enlargement 8 and thus prevents endwise separation of the drive shaft and support housing.

Brake drum 28 has an inwardly projecting cylindrical hub 41, and by means of this and a bearing sleeve 42 which is carried by an enlarged portion 43 of drive shaft 6, brake drum 28 is mounted for rotation on drive shaft 6. Endwise play between the drive shaft and brake drum 28 is prevented by a split collar 44 which is secured to the outer end of hub 41 and projects into a peripheral groove 45 of the drive shaft.

Brake drum 29 has an outwardly projecting cylindrical hub 46, and by means of a bearing sleeve 47 which is carried by cylindrical part 48 of support housing 14, brake drum 29 is mounted for rotation on support housing 14. Endwise play between brake drum 29 and support housing 14 is prevented by means of a split collar 49 which is secured to the outer end of hub 46 and projects into a peripheral groove 50 formed in support housing 14.

When power is applied to drive shaft 6, causing it to rotate, the entire phase change device rotates as a unit, due to the fact that worms 11 and 17 are so designed that their helix angles are less than their friction angles. Driven shaft 7, therefore, rotates at the same speed as the drive shaft.

When pressure is applied to brake drum 28 by means of brake shoe 32, which may be actuated by a plunger 51 of an air cylinder 52, causing brake drum 28 to stop, spur gear 22 commences to revolve and continues to revolve until brake shoe 32 is released and is again free to revolve.

When spur gear 22 revolves, it in turn causes worm 17, worm wheel 16 and worm 10 to revolve in a planetary manner around worm wheel 9, thus causing driven shaft 7 to decrease in speed and change its phase with relation to drive shaft 6. Upon releasing brake shoe 32, the planetary action ceases and the whole unit again revolves at one speed, but in a different phase relation.

If brake drum 29 is stopped by pressure of brake shoe 33, actuated by plunger 53 of an air cylinder 54, then the same action takes place as described above, with the exception that driven shaft 7 advances in speed, whereby its phase with relation to drive shaft 6 is changed. This reversal in direction of rotation is obtained through the use of spur gear 23 which causes worm 10 to revolve around worm wheel 9 in the opposite direction from that in which it revolves when brake drum 28 is stopped.

It will be apparent that the brake shoes may, if desired, be operated hydraulically or by solenoids under remote control.

As above pointed out, the planetary gears do not revolve during normal operation of the device, but only during phase change adjustments. It will also be apparent that the drive and driven shafts revolve in the same direction during normal operation of the device and not in opposite directions as in a straight differential, where an additional set of gears is necessary in order to obtain rotation of the shafts in the same direction.

Having thus described my invention, what I claim as new and desire to secure by Letters Patent is:

1. In a phase change device, axially aligned drive and driven shafts, a pair of internal ring gears axially aligned with said shafts, a worm wheel carried by one of said shafts, a support attached to the other of said shafts, a worm mounted on said support and meshing with said worm wheel, a worm wheel attached to the shaft of said worm, a worm meshing with said worm wheel, a pair of spur gears rigidly connected to said worm, positioned on opposite sides thereof and axially aligned therewith; one of said spur gears being in mesh with one of said ring gears, an idler gear carried by said support and meshing with the other of said ring gears and with the other spur gear, and means for at will preventing rotation of one or the other of said ring gears for adjusting the phase relation of said drive and driven shafts.

2. In a phase change device, axially aligned drive and driven shafts, a pair of internal ring gears axially aligned with said shafts, a worm wheel carried by one of said shafts, a support attached to the other of said shafts, a worm mounted on said support and meshing with said worm wheel, a worm wheel attached to the shaft of said worm, a worm meshing with said worm wheel, a pair of spur gears rigidly connected to said worm, positioned on opposite sides thereof and axially aligned therewith; one of said spur gears being in mesh with one of said ring gears, an idler gear carried by said support and meshing with the other of said ring gears and with the other spur gear, brake drums attached to and surrounding said ring gears and means for preventing rotation of one or the other of said ring gears whereby the phase relation of said drive and driven shafts may be adjusted.

3. In a phase change device, axially aligned drive and driven shafts, a worm wheel rigidly attached to one of said shafts, a support to which the other of said shafts is attached, a worm meshing with said worm wheel, having its helix angle less than its friction angle and which is carried by said support, a worm wheel attached to the shaft of said worm, a worm meshing with said worm wheel, a pair of spur gears mounted on the shaft of said worm and positioned on opposite sides thereof, an idler gear carried by said support and meshing with one of said spur gears, an internal ring gear with which said idler gear meshes, an internal ring gear with which the other of said spur gear meshes, a pair of brake drums which are carried by said ring gears and which are mounted for rotation about the axis of said drive and driven shafts, and brake shoes for braking said drums to adjust the angularity of said drive and driven shafts.

4. In a phase change device, axially aligned drive and driven shafts, a worm wheel rigidly attached to one of said shafts, a support attached to the other of said shafts and which encircles said worm wheel, a worm mounted for rotation on said support, which meshes with said worm wheel and has its helix angle less than its friction angle, a worm wheel attached to the shaft of said worm, a worm meshing with said worm wheel, having its helix angle less than its friction angle and the shaft of which is mounted for rotation on said support, a pair of spur gears rigidly attached to said shaft and positioned on opposite sides of said worm, a stub shaft carried by said support, an idler gear journaled on said stub shaft and meshing with one of said spur gears, an internal ring gear with which said idler gear meshes, an internal ring gear with which the other spur gear meshes, a pair of brake drums which carry said ring gears, house all of the gearing and are mounted for rotation around the drive and driven shafts, and means for braking said drums to adjust the angularity of the drive and driven shafts.

5. In a phase change device, axially aligned drive and driven shafts, a worm wheel rigidly attached to one of said shafts, a support attached to the other shaft and which overhangs and houses said worm wheel, anti-friction bearings located within said housing and between the same and one of said shafts, a worm carried by said housing and meshing with said worm wheel, a worm keyed to the shaft of said worm wheel, a shaft mounted for rotation on said support, a pair of spaced spur gears keyed to said shaft, a worm mounted on said shaft between said spur gears and meshing with said worm wheel, an idler gear carried by said support and meshing with one of said spur gears, an internal ring gear with which said idler gear meshes, an internal ring gear with which the other of said spur gears meshes, a pair of oppositely positioned brake drums to which said ring gears are attached, which completely enclose said gearing and which are mounted for rotation, one on one of said shafts and the other on said support, and means for braking said drums to adjust the angularity of the drive and driven shafts; the helix angle of said worms being less than their friction angle whereby, during normal operation the gearing is locked against movement.

6. In a phase change device, a shaft having a disk-like portion intermediate its ends and a bearing portion adjacent said disk-like portion, a worm wheel secured to said disk-like portion, a second shaft axially aligned with said first mentioned shaft, a support housing attached to said second shaft and surrounding said worm wheel and said disk-like portion, anti-friction bearings located between said housing and said first shaft, a worm carried by said housing and meshing with said worm wheel, a worm wheel attached to the shaft of said worm, a shaft carried by said housing, having a worm fixed thereto adjacent its ends and a pair of spur gears fixed thereto on opposite sides of said worm, an idler gear carried by said housing and meshing with one of said spur gears, a ring gear meshing with the other spur gear, brake drums within which said ring gears are secured and which form a housing for completely enclosing said gearing; one of said brake drums being mounted on said support housing and the other on the bearing support portion of said first shaft, and means for braking said drums to adjust the angularity of said shafts.

7. In a phase change device, two axially aligned shafts, a worm wheel carried by one of said shafts, a housing to which the other of said shafts is attached and which surrounds said worm wheel, a brake drum mounted on the shaft carrying said worm wheel, a brake drum mounted on said housing, an internal ring gear carried by each brake drum; said housing carrying a worm which meshes with said worm wheel, a worm wheel fixed with relation to said worm, an idler pinion which meshes with one of said ring gears, a shaft carrying a worm which meshes with said latter worm wheel and spur gears on opposite sides of said worm, one of said spur gears meshing with said idler pinion and the other meshing with the other ring gear, and means for preventing rotation of one or the other of said brake drums for changing the angular relation of said axially aligned shafts.

8. In a phase change device, two axially aligned shafts, a worm wheel carried by one of said shafts, a housing to which the other of said shafts is attached and which surrounds said worm wheel, bearings between said housing and the shaft carrying said worm wheel, brake drums mounted respectively on the shaft carrying said worm wheel and on said housing, and together forming an enclosure for the device, an internal ring gear carried by each brake drum; said housing carrying a worm which meshes with said worm wheel, a worm wheel attached to and rotatable with said worm, an idler pinion meshing with one of said ring gears, a shaft carrying a worm which meshes with said latter worm wheel and spur gears on opposite sides of said worm, one of said spur gears meshing with said idler gear and the other meshing with the other ring gear, and means for preventing rotation of one or the other of said brake drums for changing the angular relation of said axially aligned shafts, the helix angle of said worms being greater than their pitch angle.

9. In a phase change device, two aligned shafts, a worm wheel carried by one of said shafts, a support carried by the other shaft, a bearing between said support and the shaft carrying said worm wheel, a worm carried by said support and meshing with said worm wheel, a pair of brake drums axially aligned with said shafts, rotatable with relation thereto, and forming a housing for the device, an internal ring gear carried by each brake drum, gearing between said worm and said ring gears, carried by said housing, and constructed and arranged to normally drive said shafts in the same direction and at the same speed and means for preventing rotation of one or the other of said brake drums for changing the angular relation of said shafts.

10. In a phase change device, two aligned shafts, a worm wheel carried by one of said shafts, a support carried by the other shaft, a worm carried by said support, a pair of brake drums axially aligned with said shafts, rotatable with relation thereto and forming a housing for the device, an internal ring gear carried by each brake drum, gearing between said worm and said ring gears, carried by said housing and constructed and arranged to normally drive said shafts in the same direction and at the same speed, and means for preventing rotation of one or the other of said brake drums for changing the angular relation of said shafts.

11. In a phase change device, two aligned shafts, a worm wheel carried by one of said shafts, a support carried by the other shaft, a bearing between said support and the shaft carrying said worm wheel, a worm carried by said support, meshing with said worm wheel and having its helix angle greater than its friction angle, a pair of brake drums axially aligned with said shaft, rotatable with relation thereto, and forming a housing for the device, an internal ring gear carried by each brake drum, gearing between said worm and said ring gears, carried by said support, and constructed and arranged to normally drive said shafts in the same direction and at the same speed and means for preventing rotation of one or the other of said brake drums for changing the angular relation of said shafts.

JOSEPH P. MINGLE.